United States Patent [19]

O'Neal et al.

[11] 3,999,279

[45] Dec. 28, 1976

[54] METHOD OF MAKING A PUNCH ASSEMBLY

[75] Inventors: Cothburn M. O'Neal, Dallas; Alfred M. Mayo, Richardson, both of Tex.

[73] Assignee: Riverside Press, Inc., Dallas, Tex.

[22] Filed: July 31, 1974

[21] Appl. No.: 493,213

Related U.S. Application Data

[62] Division of Ser. No. 309,192, Nov. 24, 1972, abandoned.

[52] U.S. Cl. .............................. 29/458; 264/263; 264/267; 264/269; 264/334
[51] Int. Cl.² ................... B23P 15/00; B29G 7/00
[58] Field of Search ......... 264/261, 259, 263, 242, 264/156, 267, 269, 219, 334; 156/7, 8, 18; 29/469, 458, 527.1, 203.6; 235/50 R, 54 R

[56] References Cited

UNITED STATES PATENTS

| | | | |
|---|---|---|---|
| 1,558,505 | 10/1925 | Ray | 264/259 |
| 2,762,149 | 9/1956 | Mears | 156/8 |
| 2,915,789 | 12/1959 | Dykstra et al. | 264/156 |
| 2,940,838 | 6/1960 | Snyder et al. | 156/18 |
| 3,192,567 | 7/1965 | Abernethy et al. | 264/261 |
| 3,230,583 | 1/1966 | Ott et al. | 264/261 |
| 3,239,590 | 3/1966 | Trimble | 264/261 |
| 3,248,370 | 4/1966 | Reischl | 260/75 NP |
| 3,251,018 | 5/1966 | Bennett | 264/261 |
| 3,424,376 | 1/1969 | Evans | 235/50 R |
| 3,540,314 | 11/1970 | Howard | 264/242 |

FOREIGN PATENTS OR APPLICATIONS

| | | | |
|---|---|---|---|
| 275,107 | 6/1930 | Italy | 264/261 |

OTHER PUBLICATIONS

Skeist et al., Epoxy Resins, Reinhold, N.Y., (1964), pp. 130–136 & 180.
Dombrow, Polyurethanes, Reinhold, N.Y., (1965), pp. 161–163 & 175–179 relied on.

Primary Examiner—Willard E. Hoag
Attorney, Agent, or Firm—Hubbard, Thurman, Turner & Tucker

[57] ABSTRACT

A method of making a punching mechanism for multiple selective perforation of a computer compatible card for use with a punch selector bank having slidable rods which are engaged in a locked position by operator manipulation of corresponding keys is disclosed. The ends of the selector rods are adjacent the butt end of punches slidable in a fixed plate. A punch plate slidably receives the opposite cutting end of the punches. A perforate template is secured to the punch plate and spaced apart to provide a card slot between the punch and template. The punch includes a latching switch mechanism to insure the card is properly inserted which will not permit reciprocation of the punch unless the card is properly inserted. An eccentric drive is adapted to reciprocate the guide and template toward the punches and the punches blocked by the locked rods will perforate the inserted card. A special punch is adapted to sever a portion of the card after it is in the card slot to orient the card for subsequent processing. The guide plate and template are fabricated by a molding process to achieve high accuracy in the location of the punch slots. The punching area of the guide plate and template contained within a frame member is filled with a plastic resin on a die. The die has projections corresponding to the location and size of the punches and when the frame is removed after solidification of the plastic, the frame contains multiple perforations precisely corresponding to the punches.

7 Claims, 9 Drawing Figures

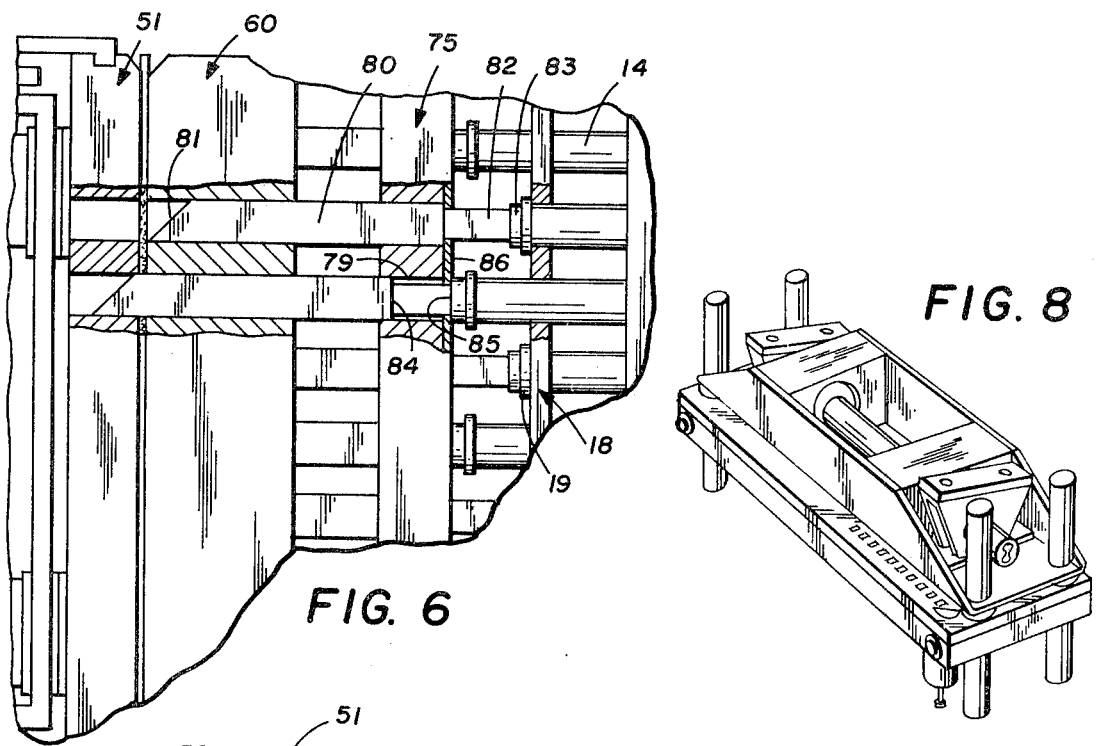
FIG. 6
FIG. 8
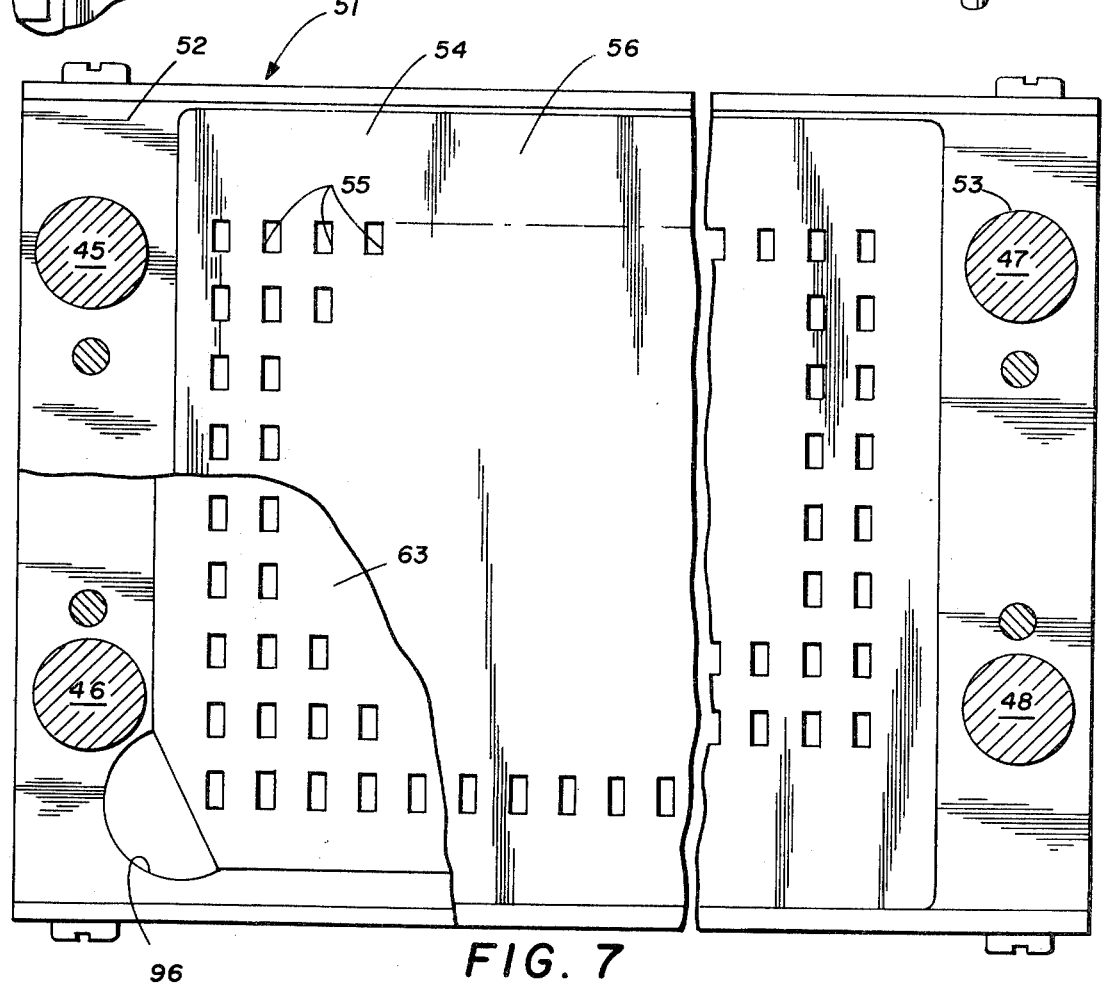
FIG. 7

METHOD OF MAKING A PUNCH ASSEMBLY

This is a division of application Ser. No. 309,192, filed, Nov. 24, 1972, and now abandoned.

This invention relates to a gang punch and more particularly to a punch mechanism for use in connection with a voting machine which records each voter's selections on a punched card so that the card may be subsequently processed by a computer operation.

With automated voting machines commonly in use, the numerical vote is generally recorded in each machine on individual counters which record the total number of votes cast on a machine for each candidate and each issue in a single election.

The election laws of many states also require that a permanent record of the votes cast on a machine also be provided. Therefore, it is often customary to provide a printout that records from the counters by contact reproduction using contact carbon paper. In this way, after the election day is completed, the accumulated totals are permanently imprinted on a roll of paper and transcription errors in reading or recording the counter readings are minimized. However, in any event, the tabulation of a total vote must still be done manually, that is, the votes cast for each candidate and issue must be tabulated and totaled to compute the final election results. The tabulation and compiling of returns may take many hours and cannot be completed until after the poles close, delaying the election results. Therefore, in order to expedite tabulation of election returns, it has been recognized that data processing compatible cards marked according to each voters choice would substantially lessen the time required for tabulation of the election results as the results could be rapidly processed by computer. Accordingly, apparatus have been provided which perforate computer cards in a pattern corresponding to the voter's selection. The votes may then be tabulated in a computer rapidly and almost simultaneously with the voting.

However, such card marking devices have not found general acceptance in that prior art devices were not capable of multiple punching with the required accuracy. Card sorting and reading devices presently in use require that the perforations in the computer card undergoing processing be extremely accurate, that is, very small variations or deviations in the size or location of the perforation will cause a card not to properly register. Therefore, there exists a need for a device which will accurately punch the computer card corresponding to the voter choices.

The present invention primarily constitutes an improvement over the punching mechanism disclosed in U.S. Pat. No. 3,524,969, issued Aug. 18, 1970, to C. M. O'Neal and commonly assigned with the present invention. The aforementioned patent discloses a punching mechanism and a cooperating bank of punch selector rods which serve to actuate the appropriate punches. The punching assembly includes a pair of movable perforated plates which are spaced apart to accept a computer card. Adjacent the movable punch plate a matching stationary perforated plate holds punches axially aligned with the holes in the movable guide plate. The punches are also axially aligned with the punch rods in the punch rod selector assembly. The movable perforated plate and the guide plate are held together as an integral unit and when the voting lever is actuated, the punch plate and guide plate are caused to move against the punches. The punches blocked by the push rods in the punch selector bank will resist the motion of the punch plate, and will accordingly perforate the card. The remaining punches will slide, displacing their respective push rods. Thus, only the punches corresponding to the selected voter keys will be caused to perforate the card inserted in the punch.

Any card punching device which perforated a card which is to be later processed by a computer must be extremely accurate. The punching assembly described above and in U.S. Pat. No. 3,524,969 permitted multiple perforations to be placed in the card as dictated by the voter selection and with the accuracy required for computer operation. The present invention discloses an improved punching mechanism and a method of manufacturing the same which further assures accuracy and economy of manufacture.

The present invention discloses a punching assembly having a guide plate and a template which are spaced a fixed clearance apart and form the card insert space. The punches extend from a stationary plate to aligned perforations in the punch plate. Aligned selector rods in the punch selector bank, when blocked by actuation of the appropriate voting key, will in turn block or resist movement of the punches. To register a voter's choice and perforate the card, the template and guide plate are caused to move toward the punches by means of an eccentric drive that reciprocates the guide plate and template. The punches blocked by the push rods, which in turn are blocked by the linkage to the voting keys, will resist the motion of the punch assembly and perforate the card. Accuracy of the location and size of the perforations is maintained by the matching guide plate and template, and cooperating punches. The main body portion or core of the template and guide plates are molded from a suitable plastic in a special die to insure accuracy. At the punching surface of the template, a steel facing or wear plate which has been chemically etched within the close tolerances required is provided. The punches are also manufactured to extremely close tolerances. Guides are provided to insure proper insertion and alignment of a card within the slot between the guide plate and template. Thus, the design and manufacture of the punching assembly herein described insures precise accuracy of the punching operation.

A better understanding of the operation and advantages of the punch assembly of the present assembly will be had from the following description and drawings in which:

FIG. 6 is a partial detail view showing the punches and a portion of the assembly in enlarged detail;

FIG. 7 is a view of the template taken along lines 7—7 of FIG. 3 with part of the surface broken away to better illustrate the construction;

FIG. 8 is a perspective view of the drive arrangement for the punch assembly; and FIG. 9 illustrates the method of molding the body or core of the main punch components.

Figure 1:
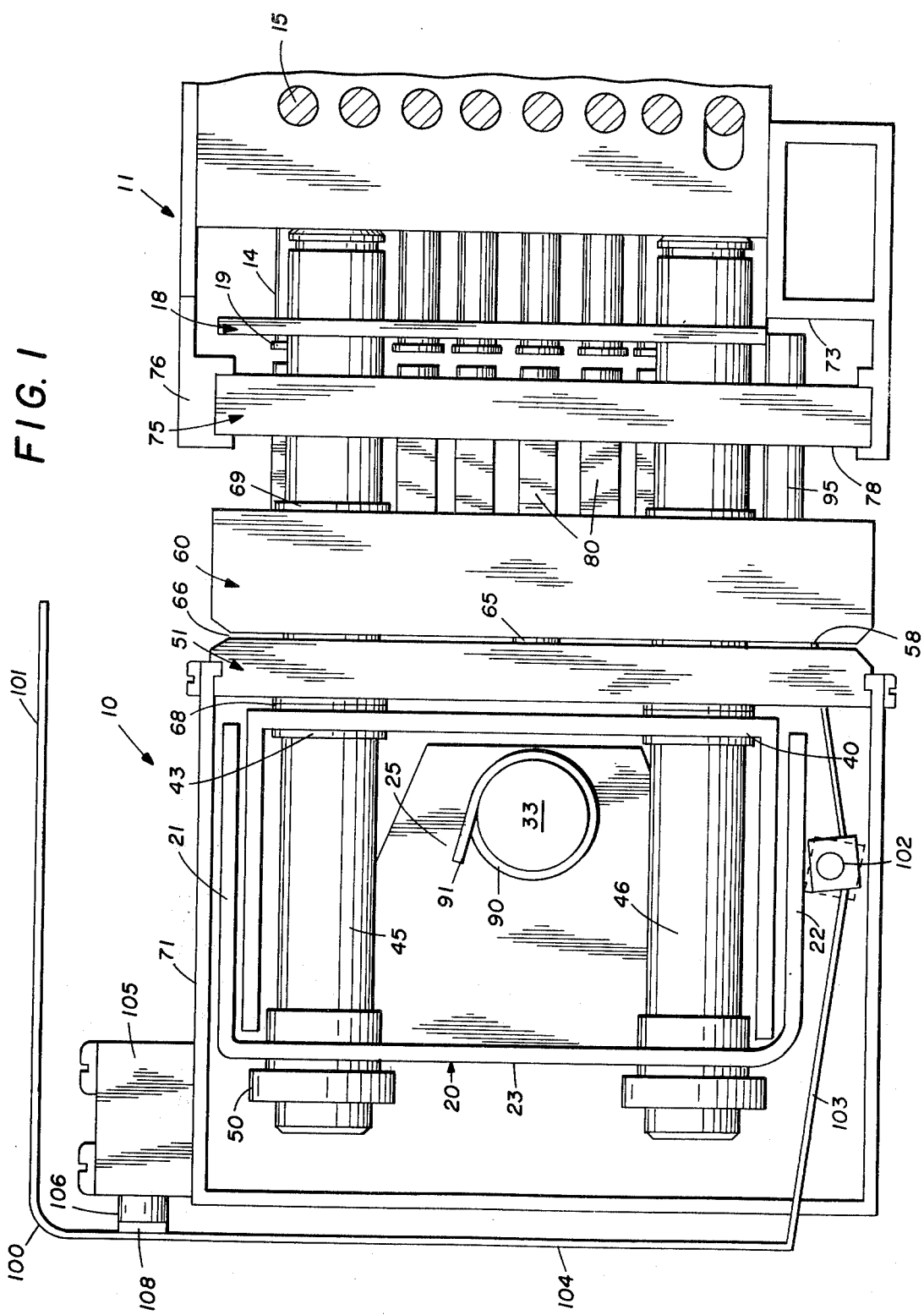
FIG. 1 is a side view of the punching assembly of the present invention.
Figure 2:
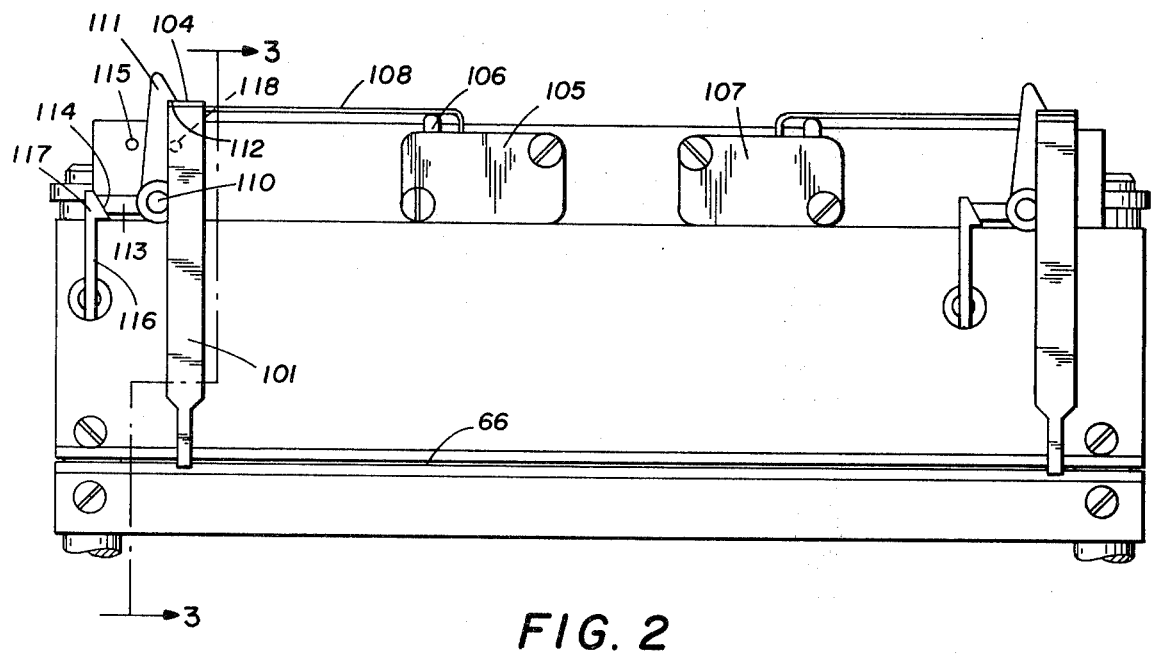
FIG. 2 is a top view of the punching assembly of the present invention.

Turning now to the drawings, FIGS. 1 and 2 illustrate the punch assembly of the present assembly in conjunction with a punch bank selector mechanism for selecting the appropriate punches in a voting machine. The voting machine may be of any mechanical type having lever or key operated linkages and for that reason description of the voting machine which per se forms no part of the invention is not deemed necessary.

The punching assembly is generally indicated by the numeral 10 and the punch selector bank by the numeral 11. Although the punch rod bank 11 is described in detail in aforementioned U.S. Pat. No. 3,524,969, a brief description of the operation and construction will be provided to assist in the understanding of the present invention.

Selector bank 11 comprises a stack of selector plates 13, one for each column of voting buttons in the voting unit. The plates 13 are grooved longitudinally to receive longitudinal push rods 14, each rod progressively longer than the preceding rod. The longitudinal rods 14 are slidable in grooves in selector plate 13 and are intersected by transverse rods 15. Transverse push rods 15 are linked to the voting keys, the rod at the top of the column being the longest and each successive rod being shorter in descending order so that rods 15 will block the movement of the corresponding longitudinal rods 14 when the corresponding key is voted and will allow the rod to pass when the key is not voted. The longitudinal push rods 14 extend and are slidable through a movable perforated plate 18 at the end of the punch selector bank and are provided with snap rings 19 on their outer ends. When a voter makes a selection depressing a voting key he will cause the corresponding transverse rod 15 attached to the voting key to be moved laterally one space into the selector bank, thereby moving into blocking engagement with the corresponding longitudinal selector rod 14. The blocked longitudinal rods 14 will block the punch upon actuation of the punch assembly to cause perforation of the card as will be explained in greater detail hereafter.

Figure 4:
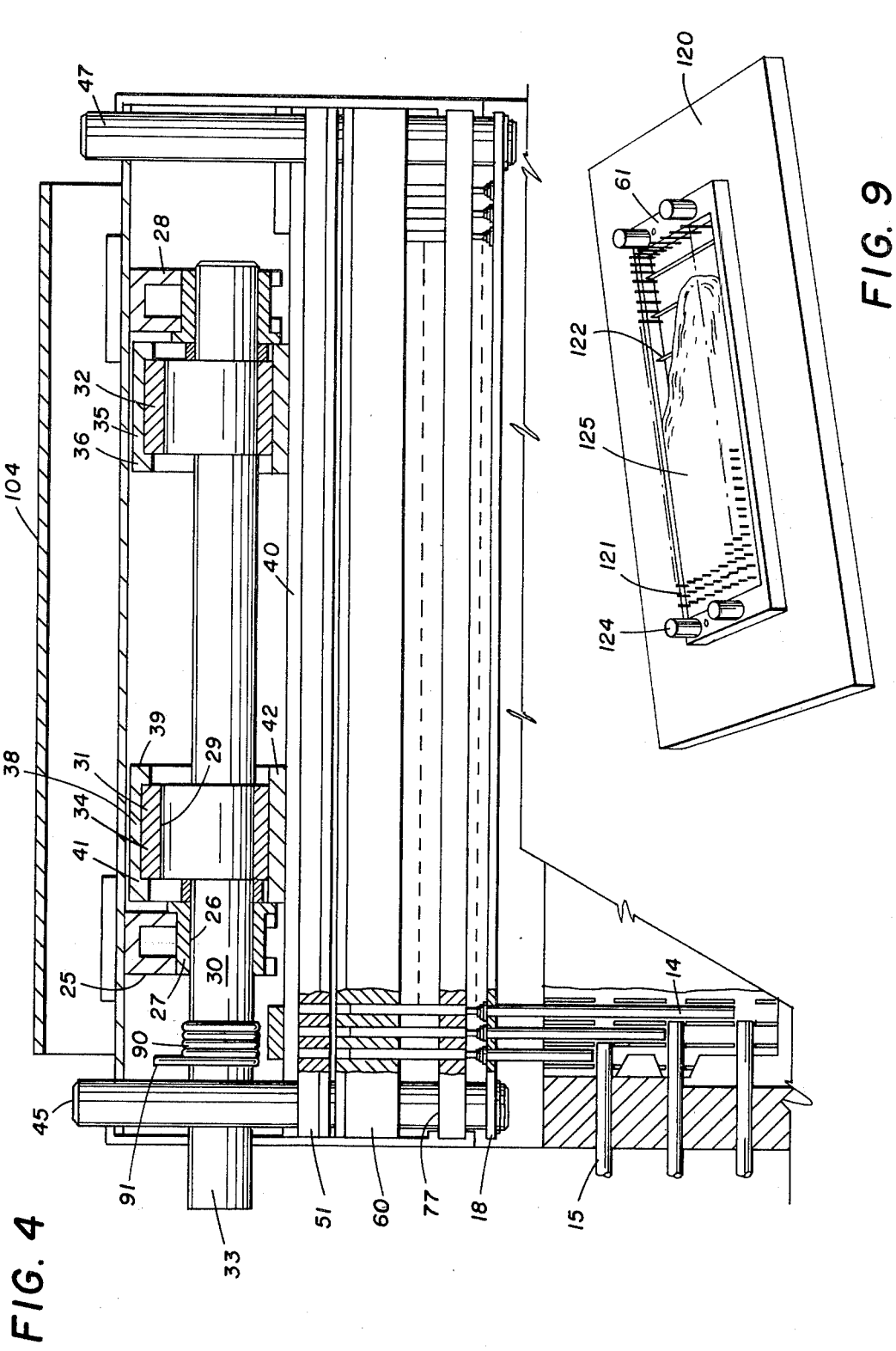
FIG. 4 is a sectional view taken along lines 4—4 of FIG. 3.

The punch mechanism 10 includes main frame element 20 in the form of a U-shaped channel having back 23 and top and bottom legs 21 and 22, respectively. The main frame member extends the width of the punch and is secured by a bracket, not shown, to a suitable fixed structural member as seen in FIG. 4. Adjacent one end of frame member 20 is bearing block 25 which is secured to the back 23 of frame member 20. A journal bearing 27 is inserted in bore 26 of bearing block 25 to complete the bearing assembly. A similar bearing block and journal assembly 28 is mounted adjacent the other end of frame member 20.

Transversely extending drive shaft 30 is supported for rotation in bearing blocks 25 and 28 with shaft extension 33 provided for connection to a driving motor, as will be explained hereafter. Inwardly spaced from bearing blocks 25 and 28 on shaft 30 are eccentric lobes 31 and 32, having their centers displaced from the longitudinal axis of shaft 30.

Eccentric 31 is mounted for rotation within journal block 34. Block 34 is generally square and is provided with concentric bore 29 which receives eccentric 31. Journal block 34 is slidably mounted in U-shaped member 38 so that it can vertically reciprocate between parallel slides 41 and 42 of member 38. Flanges 39 of member 38 extend along opposite sides of member 31 to constrain the journal from lateral movement.

Another journal block 36 provides the mounting for opposite eccentric member 32. Journal block 36 is slidably mounted in U-shaped guide block 35 so that it can vertically reciprocate therein. Guide blocks 35 and 38 are affixed to longitudinally extending vertical drive plate member 40. Plate 40 is formed in a general U-shape for strength and rigidity of the member without adding undue weight or bulk.

It will be seen with the construction described, that as drive shaft 30 is rotated, plate 40 will be driven through the eccentrics 31 and 32 to horizontally reciprocate. The vertical displacement imparted by the eccentrics about the axis of shafts 30 will be taken up as lost motion as relative movement between blocks 34 and 36 and members 35 and 38 is permitted.

Figure 3:
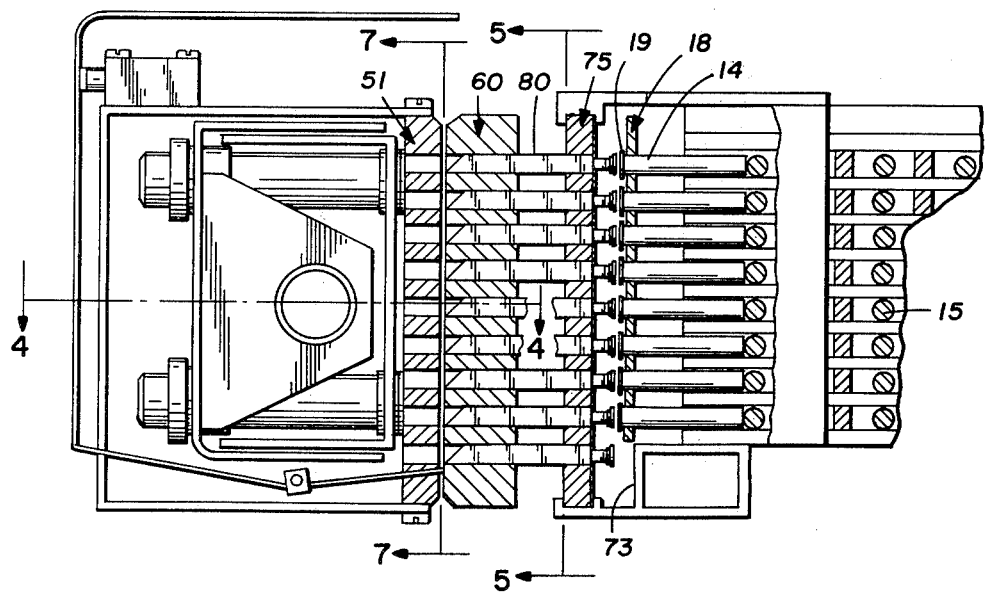
FIG. 3 is a sectional view taken along lines 3—3 of FIG. 2.

FIGS. 1 and 3 show the punch drive mechanism in the fully retracted position. Upon 180° rotation of the shaft 30, plate 40 will be advanced toward the punch selection bank 11 a distance twice the distance between the centers of the drive shaft and the eccentric lobe. Upon continued rotation, shaft 30 will return to the position shown.

Looking now at the punching mechanism, horizontal actuator rods 45, 46, 47, and 48, arranged in a rectangular pattern, extend through holes provided in plate 40. For added strength, the actuator rods extend to the rear, slidable through bearing inserts 50 provided in member 23 of the main frame member 20. A snap ring groove in each of the rods adjacent plate 40 accepts snap ring 43 which abuts the rear face of drive plate 40. As will be seen, the actuator rods transmit the motion of drive shaft 30 and drive plate 40 to carry the card into punching engagement with the punches.

A punching template 51 is supported on actuator rods 45, 46, 47 and 48 at appropriately spaced holes 53 in the corners of frame 52 of template 51. The purpose of the template is to receive the ends of the punches upon penetration of the card to insure accuracy of the punching operation. The construction of the template may best be seen in FIG. 7 and includes an outer rectangular frame member 52 which contains an inner core 54 having rows of aligned perforations 55 corresponding to the location of the punches. A thin perforated stainless steel wear plate 56 is provided at the punching surface of the template to reduce wear. The number of perforations 55 in the template may vary, of course, the template shown having punching capability for standard data processing with provision for nine horizontal rows and up to 40 vertical columns of perforations. The accuracy of the punching process depends a good part on the accuracy of the template. The accuracy of the template is insured in the fabrication process by the method in which it is fabricated which will be described in greater detail hereafter.

Affixed to the template and spaced a small distance apart is guide plate 60. The space 66 between the template and the guide plate defines the card insert slot. Guide plate 60 is similar in construction to template 51 and has generally rectangular frame member 61 surrounding a core member 63. Core 63 has perforations 64 in a pattern matching the perforations in template 51 and the arrangement of the punches. Spacer member 58 inserted between template 51 and guide plate 60 determines a clearance therebetween as well as serving as an index and stop to vertically align the card inserted in the slot 66. The punch card is aligned horizontally by the inner edges of opposite actuator rods 45, 47 and 46, 48, respectively. The template and guide plate assembly is held together as a unit by dowel pins 65 extending between the plates. The assembly is held in place on the actuator rods at its inner edge by engagement of template 51 with plate 40 through spacers 68 and at the outer edge by snap ring 69 on the actuator which engages guide plate 60. Spacers 68 may be inserted between the drive plate 40 and guide plate 51 to obtain adjustment for purposes of alignment.

A generally U-shaped member 71 extends from a point of attachment at the upper edge of template member 51 around the main frame member 20 and to the lower edge of template 51. Member 71 serves as a stiffener to resist deflection of template 51 during the punching operation so that inaccuracies are not introduced due to structural flexing by imposed forces. Substantial forces, something on the order of seven pounds for each punch, are required during the punching operation. Member 71 also serves as a housing support for the card interlock which will be described hereafter.

Spaced apart from guide plate 60 is punch plate 75 which is stationary and mounted in fixed brackets 76. Holes 77 in the frame 78 of punch plate 75 permit actuator rods 45 through 48 to slide back and forth through the frame. Punch plate 75 has perforations 79 in a pattern identical to template 51 and guide plate 60 and exactly aligned therewith. Punches 80 are held in place in the perforations 79 in punch plate 75.

As best seen in FIG. 6, punches 80 are generally rectangular in cross-section, having a beveled cutting edge 81 at the forward end of the punch. The opposite end is provided with reduced shank portion 82, terminating in a head 83 adjacent the end of the blocking rods. A series of stringers 86 extend horizontally between adjacent rows of the punches to abut opposite inner ends 84 and 85 of the recessed shank portion 82, thereby serving to limit the axial travel of the punches.

In the inactive position, the blades of punches 80 extend well into the guide plate 60 so that the card slot 66 is not obstructed. The relative fit between the punches 80 and the perforations 64 in the guide plate 60 is almost an interference fit so that the punches, unless blocked by the corresponding rods 14, will be carried rearward with plate 60 upon actuation of the punch.

The drive shaft 30 can be driven to rotate by any appropriate drive connection. FIG. 4 shows a simple clutch arrangement that may be used to drive the punch from an adjacent continuously rotating shaft.

A coupling 90 in the form of a coil spring is affixed to shaft 33 which is rotated by appropriate drive means. The coil spring has an end 91 projecting therefrom. Shaft 30 extends to within coupling 90 and is of a diameter slightly less than the internal diameter of the coupling so that it may, when not actuated, turn freely therein.

When the punch is to be operated, coupling 90 is engaged to cause shaft 30 to be driven by shaft 33. Normally, extension 91 is engaged by an actuating arm, not shown, which controls one operation of the coupling. The actuating arm would be affixed to a stationary frame member of the machine and would normally assume a position engaging extension 91 to disconnect shafts 33 and 30. When extension 91 is disengaged by the arm, coil 90 will be tightened about drive shaft 30, causing it to be driven by the drive shaft. The actuating arm will be returned by a spring or the like to its normal position as the drive shaft completes a full rotation. The engagement of 91 will loosen coupling 90, again permitting full rotation of the drive shaft within the coil coupling 90.

The basic operation of the punch is as follows, it being assumed that the punch and punch push rod bank are incorporated in a voting machine as described above. Prior to making his selections, the voter will insert a data processing compatible punch card into the slot 66 in the punching assembly 10. The horizontal spacing between actuator rods and the spacers 58 insures that the card is properly oriented, both vertically and horizontally, within the slot 66. The voter then makes his selections, depressing the appropriate vote registering keys causing, through linkages, the corresponding transverse rods 15 to advance into the plates 13 of the block assembly so that movement of the corresponding longitudinal rods 14 is prevented. When the voter has completed making his selections, the main voting lever is operated. The operation of the main voting lever causes actuation of drive shaft 30 through for example a drive and clutch arrangement 90 as described above. Rotation of the drive shaft 30 will impart a linear movement to plate 40 and actuator rods 45 through 48 by virtue of eccentrics 31 and 32 and their respective mounting blocks. The lost motion connection between block 34 and slide plate prevents any vertical movement being imparted to plate 40.

As plate 40 advances, template 51 and guide plate 60 will also move together as the motion is transferred by snap rings on the drive shafts to the unitary template guide plate assembly and to plate 60. As the template and guide plate advance, those punches blocked by the blocked transverse rods 14 will remain stationary while the unblocked punches will slide rearwardly through the stationary plate 75, displacing their respective corresponding rods 14. Thus, as best seen in FIG. 6, the blocked punches which remain stationary, as for example, the upper punch in the cutaway section, will perforate the card inserted in slot 66 as the punch advances. As drive shaft 30 continues to rotate, drive plate 40 will reach its maximum forward position and begin to retract, causing retraction of the template and guide plate assembly. The rods 14 will be returned to their extended position by return plate 18, engaging snap rings 19 on the rod ends. The displaced punches will also be returned to their normal position by the abutting rod ends 19. Return movement of the punching assembly also strips the card off the punches. The card can then be removed from the machine to be processed to tabulate the voting and election results.

Means are provided with the punch of the present invention to code the punch card with the serial number of the machine in which the card was inserted. Also, it is unnecessary with the present invention to orient the card in any special position prior to insertion into the machine as the corner of the card is clipped after the card is inserted into the machine.

Looking at FIG. 3, it will be seen that the lower row of punches extending from the stationary punch plate 75 have no corresponding blocking rods. Rather, the outer end of this row of punches is adjacent a fixed abutment 73 so that upon actuation of the punching unit, the punches in this row will always be blocked and accordingly will always punch the card. The punches in this lower horizontal row are arranged to correspond in binary code to the serial number of the machine and thus permanently code the card inserted in the machine with the serial number of the machine. The purpose of printing each punch card with the serial number of the machine is to insure the integrity of the election by providing a cross-check of the visual readings taken off the counters in the machine as the results can be processed to give a print-out of the individual machine tools. This also permits the election results to be tabulated according to precinct in the final election results.

Figure 5:
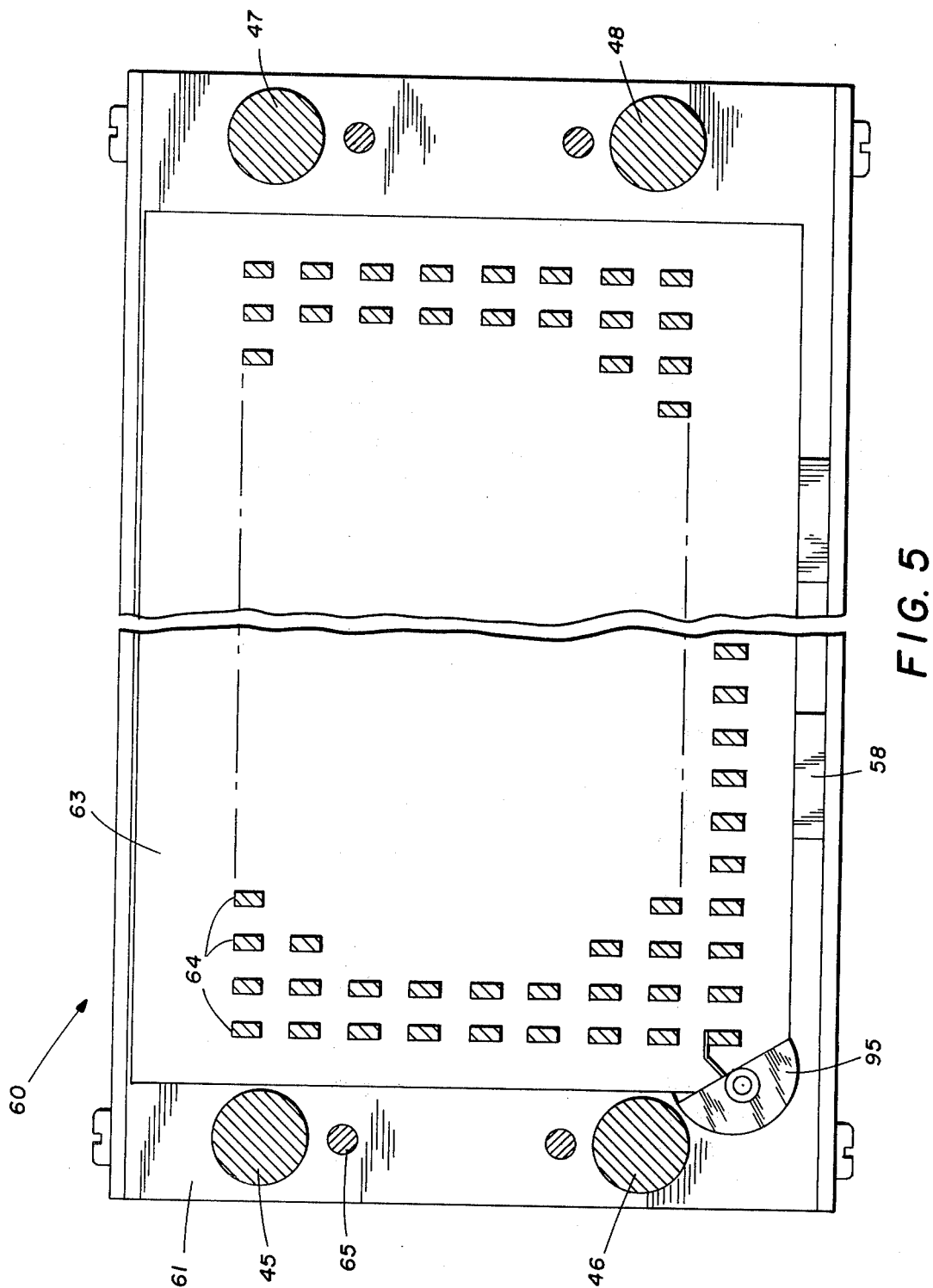
FIG. 5 is a view of the punch plate taken along lines 5—5 of FIG. 3.

The punch card assembly of the present invention also simplifies voting in that it does not require the voter to insert the blank punch card into the machine in any particular orientation. The card is self-orienting as a corner of the card is clipped during the punching process rather than being preoriented prior to the voting operation. This means that the voter does not spoil his card or disenfranchise himself by improperly placing the card in the machine. Looking at FIG. 5, it will be seen that a semicircular punch 95 is located in the lower left hand corner of guide plate 60. The punch is slidable in guide plate 60 and is received in an aligning slot 96 in template 51. The punch is located so that it will sever the lower left hand corner of the card when properly inserted in slot 66. Punch 95, similar to the other punches in the ninth row, is always engaged by abutment 73 upon actuation of the punch.

Further, the punch of the present invention also assumes that the data processing card is completely and properly inserted into slot 66. The punch card must be inserted the full depth into the slot until it engages the lower vertical stop and, once the card is in place, it is prevented from being prematurely withdrawn from the machine. Looking at FIGS. 1 to 3, it will be seen that affixed to the top of housing 71 are microswitches 105 and 107 wired in series and connected into the circuit controlling the motor which drives drive shaft 33. If either one or both microswitches 105 or 107 are in an open condition, the punching cycle will not be initiated as the drive motor circuit is not operational. The microswitches can also be interlocked to other main system components such as the main vote lever. In this arrangement, the switches are connected in series to a solenoid. The solenoid is positioned so that in its energized state the solenoid armature mechanically obstructs the main vote button to prevent depression.

Referring to FIG. 3, a generally U-shaped feeler member 100 is pivotally mounted to the bottom of stiffener member 71 at 102. Feeler 100 includes lower member 103 which extends through a slot in template 51 to intersect card slot 66 at a location above the lower vertical stop in slot 66. Connected to arm 103 and vertically extending along the back of housing 71 is member 104. Feeler member 101 extends from member 104 so that in its lower position it blocks removal of the card from slot 66. Plunger 106 is associated with microswitch 105 and, when depressed, closes the contacts therein. Actuating arm 108 is affixed to microswitch 105 and extends generally horizontally along the top of the stiffener box to inside of vertical member 103 to contact and depress plunger 106. A suitable visual read-out such as an indication light controlled by the microswitch and located on the machine panel can also be included to show that the card is properly in place.

It will be observed that when a card is properly inserted in slot 66 it will depress the forward end of feeler member 101, thereby rotating member 100 about point 102, causing feeler member 101 to move downwardly into a position over slot 66. Rear member 104 will also be caused to be moved forward, engaging and moving forward actuator lever 108, thereby depressing plunger 106, activating microswitch 105.

A latching mechanism is provided to hold member 104 and actuator lever 108 in the condition until the voting cycle is completed. The latch includes pivotal member 110, having latching arm member 111 notched at 112, and arm member 113 extending at right angles to arm 111, having angular surface 114 at its outer end. A stationary retainer in the form of a spring 116 formed into a V-shape at 117 is mounted so that end 117 engages surface 114. It will be seen that after a card is inserted into slot 66, member 100 will pivot forward, bringing arm 104 and actuator 108 forward until member 104 is engaged by the notch 112 and arm 111. Spring retainer 116 bears against arm 113, thereby maintaining engagement of latching pivot 110 and retainer 115. Upon actuation of the voting cycle, as housing 71 and attached pivot 110 are advanced, surface 114 will ride along end 117 until lever 113 drops into engagement at the rear side of the tip 117. As the housing begins to return to its inactive position, the engagement of lever 113 at the rear tip 114 will cause latch 110 to pivot, thereby releasing members 108 and 104 at notch 112. This permits member 110 to return to its normal position, releasing feeler 100 to permit insertion of another punch card. Stops 115 and 118 limit the pivotal movement of latch 110. A similar latching arrangement is provided in combination with microswitch 107 and is not described in detail as operation is the same as that described with reference to switch 105.

The provision of a feeler arm such as 101 adjacent either end of the card insures that the card will be properly inserted and that the card is not tipped or incompletely inserted within slot 66. It will be noted that once the card is properly inserted, rotating member 100 into the latched position, member 101 obstructs removal of the card from slot 66 and the card can only be removed in a manner so that it is mutilated or torn, thereby destroying the card.

As mentioned above, the location and spacing of the punches and the punch card must be maintained within very close tolerances in order to be compatible with the commercial card reading and processing equipment. The accuracy of the punching device of the present invention is maintained by the arrangement, and close tolerances of the template, guide plate and stationary punch plate. Similarly, the punches are manufactured to a very close tolerance, on an order of plus or minus .0001 by a progressive drawing process, wherein the wire from which the punches are made is drawn progressively through a series of dies of increasing accuracy.

Template 51, guide plate 60, and stationary punch plate 75 are all manufactured in a similar manner. Looking, for example, at guide plate 60, it comprises a generally rectangular, exterior metal frame 61 defining a core in which are placed the perforations. The frame is first formed and then, as seen in FIG. 9, it is oriented in a die 120 having aligning pins 124 which engage the holes of the frame. The pattern is established by the pins 121 which extend from the die in an exact location and are of the exact size of the punches which will be later inserted into the guide plate. A number of transverse bars 122 extend across the frames and provide strength and rigidity to the guide plate. The frame and bars 122 form a highly stiff or rigid structure which serves to restrict the tendency of the plastic core to expand or contract. Once the frame of the guide plate has been properly oriented on the die, the center portion of the stiff frame structure surrounding the pins is filled with a plastic material 125 such as urethane foam or a liquid epoxy which will subsequently harden within the frame. Upon hardening, the plate and solidified core are ejected or pulled from die 120 by suitable means such as a hydraulic ram, leaving perforations in the core accurately corresponding to those of the die. The frame 61 holds the core within precise tolerance and resists the expansion and contraction of the plastic core both during fabrication and use to maintain the precise tolerances.

Template 51 is formed in a similar manner but further provided with a stainless steel wear plate 56 at the punching surface. To insure accuracy, the perforations are placed in the steel wear plate by a chemical etching process. This process, similar to that used in the manufacture of printed circuit boards, begins with the making of a highly accurate art work enlarged many times from the actual size of the part. From this art work, a photo negative is made and reduced to the actual size of the part. A piece of stainless steel from which the part is to be manufactured is then coated with a photoresistant substance and the negative is placed over the plate and exposed in the presence of a light source. A picture of the holes is then transferred on the plate and the plate is subsequently treated with an etching chemical which attacks only those areas of the plate which contain an exact image of the perforations.

The stainless steel wear plate is then affixed to the frame of the template and the frame, along with the wear plate, is placed in the die 120 with the die pin projecting through the perforations. The cavity defined by the frame and the wear plate is filled with appropriate plastic such as epoxy or urethane and permitted to harden. When the template is removed from the die, it will have a high degree of dimensional accuracy, insuring the accuracy and validity of the punching operation to be carried out thereon.

Although the gang punch herein described has been described in the environment of a voting machine, it will be obvious to those skilled in the art that it may be put to many other uses. The punch of the present invention is adaptable to use in any kind of selection machine where a particular pattern of punches or impressions are to be transferred to a data processing card for record or tabulating purposes. The punch of the present invention can perform a multiple punching or gang punching operation with an accuracy not possible with prior art devices.

To the extent that such modifications and changes do not depart from the spirit and scope of the invention, they are intended to be included therein.

What is claimed is:

1. The method of making a perforated punch plate adapted to slidably receive a plurality of aligned punches through perforations in said punch plate, said plate having a molded core with a reinforcing frame about a periphery of said core, comprising: forming a stiff frame member having an open aperture extending therethrough, said aperture corresponding to the periphery of said core; placing said frame member on a surface of a die member forming an open faced mold cavity corresponding in size and shape to said core, said die member having a plurality of aligned pins extending therefrom and into said mold cavity said pins corresponding substantially in alignment and size to said punches;

aligning said frame member with said die to position said pins in said mold cavity in locations corresponding to the locations of the punches received in said perforated punch plate;

filling the mold cavity with a synthetic resin in a fluid state;

hardening the resin, forming said core, and bonding the resin to the frame member so that the frame member resists expansion and contraction of said resin core; and removing said frame member and core from said die to form said perforated punch plate, and removing said pins from said resin core leaving perforations in said core corresponding substantially in location and size to said punches.

2. The method of claim 1 and further comprising the steps of etching in a metal plate apertures corresponding to the location and size of said perforations in said punch plate;

affixing said metal plate to said frame member to close the aperture of said frame member; and placing the frame member on said die with said metal plate adjacent said flat surface and said plurality of aligned pins projecting through the apertures of said metal plate, said frame member and said metal plate defining said mold cavity.

3. The method of claim 1 wherein said frame member is rectangularly formed and further comprising the step of strengthening said frame member by attaching bars extending transversely between opposing sides of said frame member, said bars extending through said mold cavity so that said resin core is cast with said bars therein.

4. The method of claim 1 wherein said synthetic resin is a urethane.

5. The method of claim 1 wherein said synthetic resin is an epoxy.

6. The method of claim 1 and further comprising making a plurality of said punch plates using said method and assembling said plates in parallel alignment with each other with said perforations in alignment whereby said punches will slide freely in close tolerance in the perforations of said plurality of punch plates.

7. The method of claim 6 wherein said assembling step comprises connecting a first and a second of said punch plates together with perforations aligned and with a space between said first and second punch plates for insertion of a punch card to be punched by a selected number of said punches.

* * * * *